United States Patent [19]

Dogadko

[11] Patent Number: 4,646,696
[45] Date of Patent: Mar. 3, 1987

[54] PROGRAMMED ELECTRONIC ADVANCE FOR ENGINES

[75] Inventor: Peter Dogadko, Chicago, Ill.
[73] Assignee: Outboard Marine Corporation, Waukegan, Ill.
[21] Appl. No.: 678,964
[22] Filed: Dec. 6, 1984
[51] Int. Cl.[4] .............................................. F02P 5/04
[52] U.S. Cl. .................................... 123/416; 123/406; 123/602
[58] Field of Search ................ 123/416, 413, 602, 406

[56] References Cited

U.S. PATENT DOCUMENTS

| | | | |
|---|---|---|---|
| 2,906,251 | 9/1959 | Soder, Jr. | 123/99 |
| 4,114,573 | 9/1978 | Mori | 123/416 |
| 4,166,437 | 9/1979 | Bianchi | 123/416 |
| 4,175,506 | 11/1979 | Sakamoto | 123/416 |
| 4,231,331 | 11/1980 | Suzuki | 123/416 |
| 4,232,642 | 11/1980 | Yamaguchi | 123/416 |
| 4,306,536 | 12/1981 | Fitzner | 123/602 |
| 4,318,387 | 3/1982 | Fitzner | 123/602 |
| 4,377,997 | 3/1983 | Staerzl | 123/602 |
| 4,378,769 | 4/1983 | Haubner | 123/416 |
| 4,387,684 | 6/1983 | Javeri | 123/416 |

*Primary Examiner*—Ronald B. Cox
*Attorney, Agent, or Firm*—Michael, Best & Friedrich

[57] ABSTRACT

The spark plug ignition advance control for a multiple cylinder internal combustion engine has a spark ignition circuit associated with each cylinder. The circuit includes an SCR trigger operative to cause the ignition spark. A pulse generator is associated with each cylinder and puts out a control pulse to a latch gate outputting to the ignition circuit. The gate responds to a control pulse to latch in an enabled state. A frequency multiplier receives control pulses from the pulse generator and provides 360 reference pulses for each revolution of the engine. A counter responds to the control pulse to count said reference pulses. A ROM storing ignition timing data corresponding to throttle position. A throttle position sensor provides a control voltage which is applied to an A/D converter which outputs an address in the ROM and the ROM puts out the number of degrees by which the base throttle advance is to be modified and sets the counter to count said reference pulses to said number. The counter subtracts the counts (degrees) from the basic (maximum) advance and outputs a control signal (firing pulse) when the correct advance is reached. The firing pulse is applied to the latch gate which causes the SCR trigger to operate. The firing pulse also resets the system to start again for the next cylinder.

15 Claims, 17 Drawing Figures

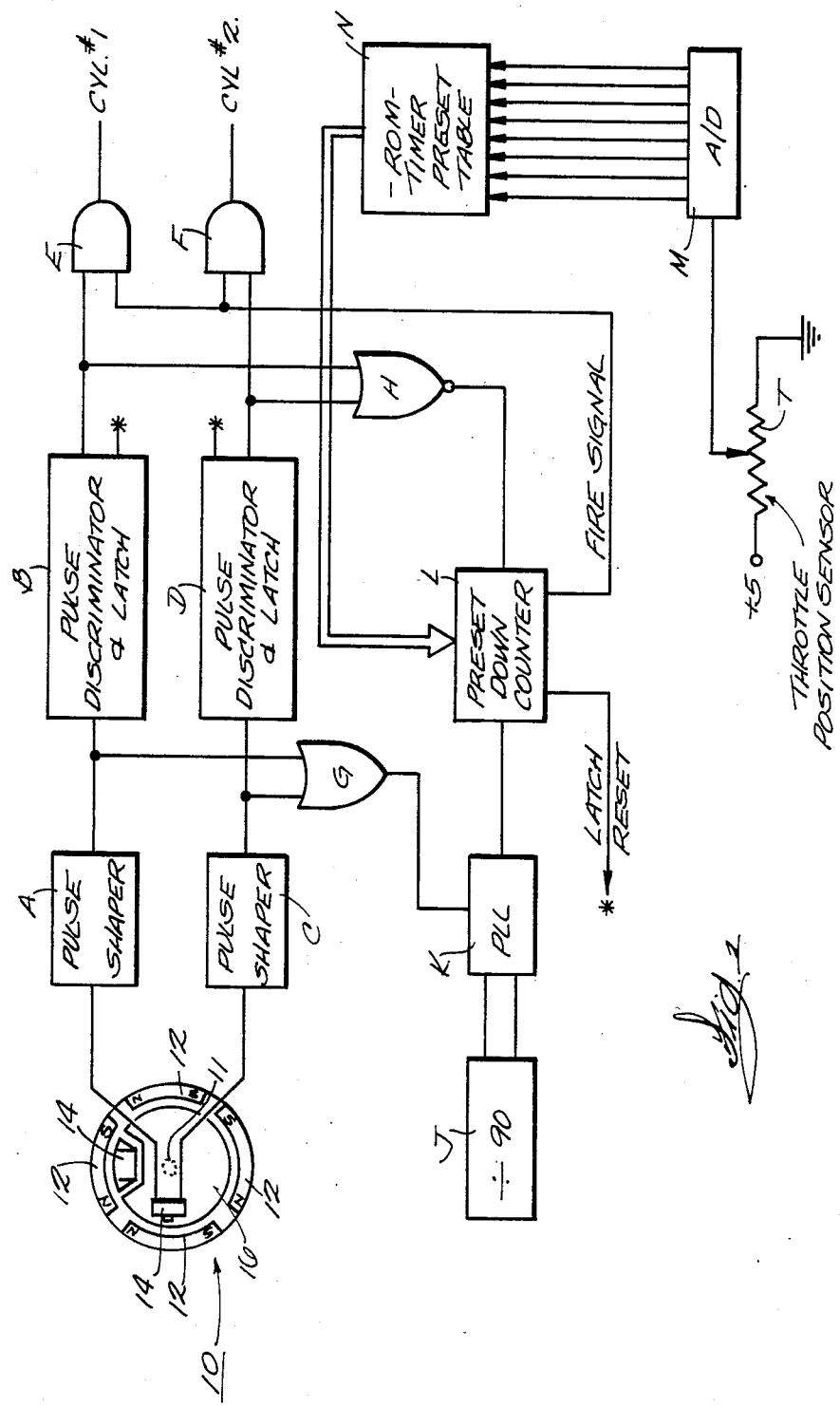

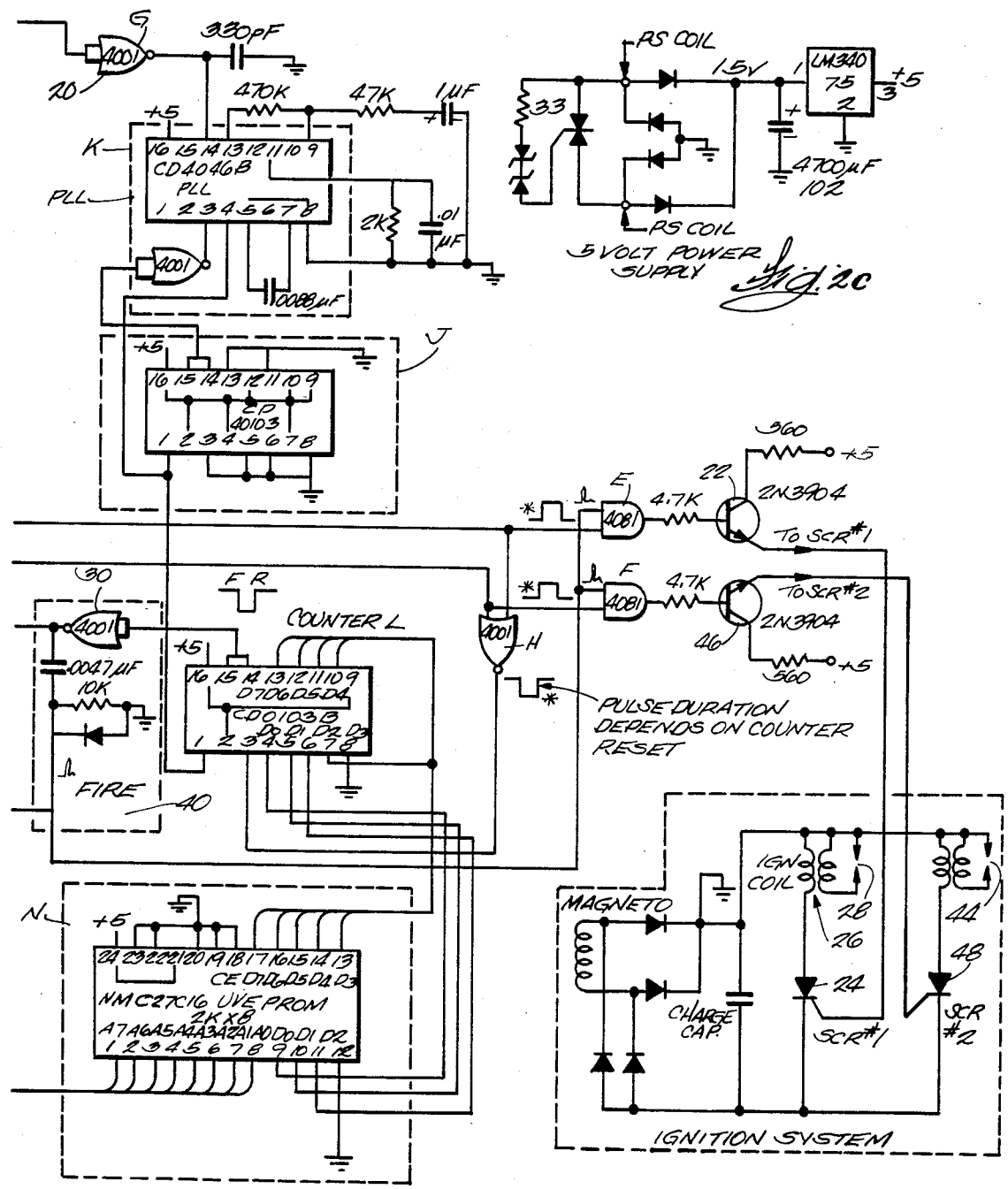

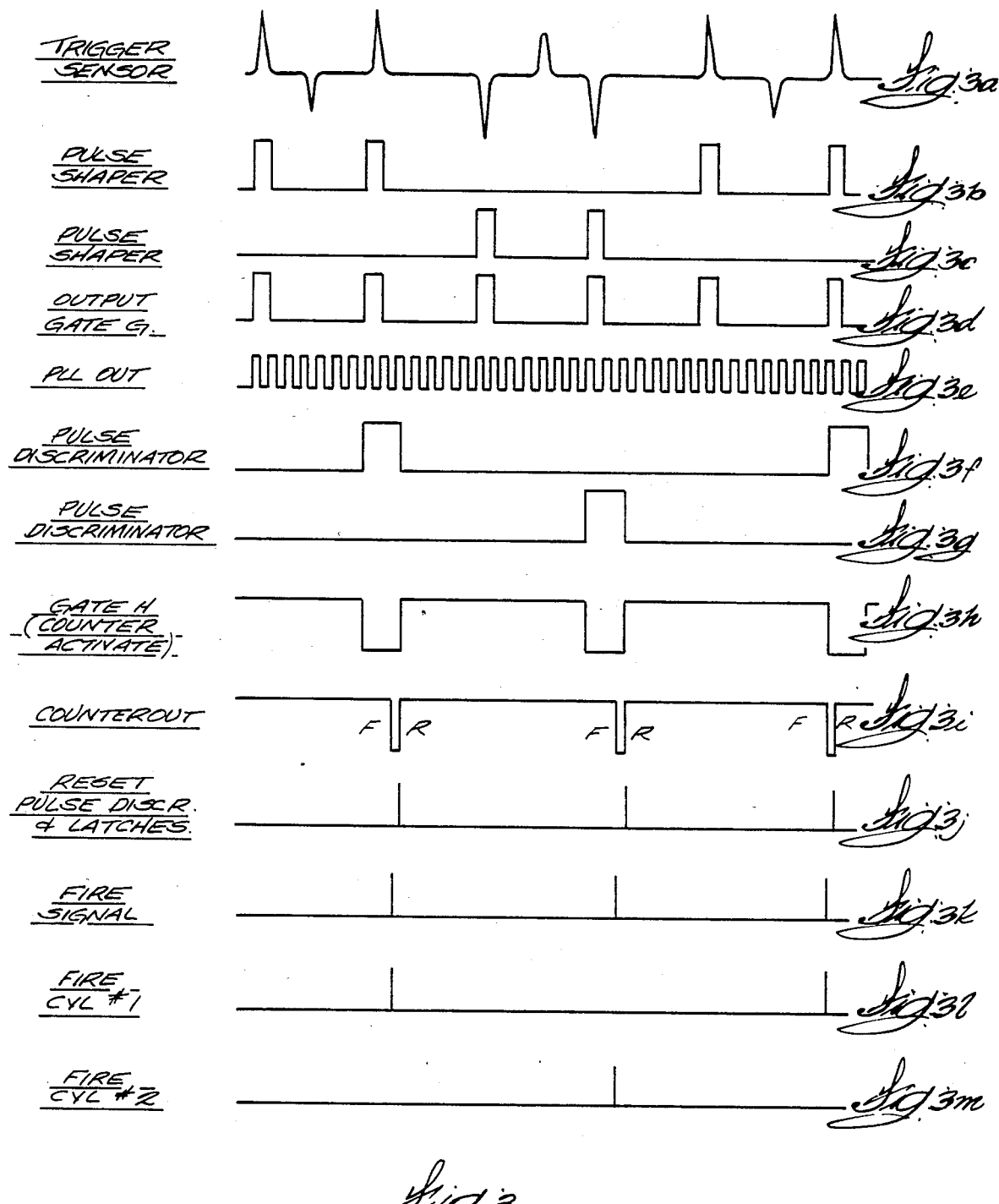

PROGRAMMED ELECTRONIC ADVANCE FOR ENGINES

BACKGROUND OF THE INVENTION

The present methods of obtaining spark advance in ignition systems is to use a rotating charge/trigger assembly or a stationary charge/trigger assembly with a speed dependant trigger mechanism. The first method uses a stator plate containing charge and trigger coils and rotated in unison with the throttle control. This usually requires a bronze bearing for the stator plate and elaborate cams to obtain the desired spark advance. Contamination and use wear the bearing and stress the wires connecting the stator and the electronic ignition module. Any change in the advance characteristics requires a change in the cams with consequent tooling cost.

The speed dependent trigger used in the second method obtains the electronic advance from the changing slope of the trigger pulse and thus requires elaborate shaping of the magnetic structure. The result is inflexible, has an advance characteristic which is limited in range, and has undesirable engine performance at idle speed (due to the initial advance). The advance cannot be varied enough at high engine speed.

REFERENCE TO PRIOR ART

Attention is directed to the following U.S. Patents:

| Inventor | U.S. Pat. No. | Granted |
| --- | --- | --- |
| Haubner et al. | 4,378,769 | Apr. 5, 1983 |
| Javeri | 4,387,684 | Jun. 14, 1983 |
| Yamaguchi et al. | 4,232,642 | Nov. 11, 1980 |
| Suzuki et al. | 4,231,331 | Nov. 4, 1980 |
| Bianchi et al. | 4,166,437 | Sept. 4, 1979 |
| Mori | 4,114,573 | Sept. 19, 1978 |
| Sakamoto et al. | 4,175,506 | Nov. 27, 1979 |

SUMMARY OF THE INVENTION

This invention provides an ignition advance control for a multiple cylinder internal combustion engine including a crankshaft and a throttle control, the ignition advance control comprising a spark ignition circuit associated with each cylinder and including trigger means operative to cause an ignition spark, means generating a control pulse associated with each cylinder, means for converting the control pulse into a predetermined number of reference pulses per crankshaft revolution, means for sensing throttle control position, means responsive to the throttle sensing means for selecting a predetermined number of reference pulses necessary to provide an amount of spark advance, means for counting a number of said reference pulses appropriate for the throttle control position, and means for firing the trigger means in response to the counting means counting a number of reference pulses.

This invention also provides an ignition advance control for a multiple cylinder internal combustion engine having a spark ignition circuit associated with each cylinder. The circuit has a trigger operative to cause the ignition spark. A pulse generator generates a control pulse associated with each cylinder. A latch device associated with each pulse generator and with each ignition circuit is responsive to the control pulse to latch in an enabled state. A device responsive to the control pulses provides a predetermined number of reference pulses for each revolution of the engine. A counter is responsive to the control pulse to count the reference pulses. A throttle position sensing device provides a control voltage to an A/D converter responsive to the control voltage to output an address in a memory storing ignition timing data corresponding to throttle position only. The memory provides the number of degrees by which the base throttle advance is to be modified and sets the counter to count the reference pulses to the number of degree whereupon the counter outputs a control signal which is applied to the latch device which has been latched in the enabled state so the device responds to the control signal and the control pulse to cause the trigger to operate.

Another feature is to apply the control signal to the counter and to the pulse generator to reset the same.

A further feature is to disable the associated latch device as a result of the reset provided by the counter.

Still another feature is to apply the control signal to the A/D converter which will cause the memory to output a new count to the counter after each spark depending on the throttle position sensor.

An important feature of the invention is to have the control pulse determine the maximum advance for the engine and the counter counts the number of degrees by which said maximum advance should be reduced.

Another feature is that all the pulse generators provide control pulses to a frequency multiplier which provides the predetermined number of reference pulses.

The control provides an electronic trigger mechanism which is independent of speed and is derived from throttle position only to trigger the spark in accordance with information programmed in a read only memory. This accommodates all throttle settings and offers unlimited advance characteristics.

This invention is not limited to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

BRIEF DESCRIPTION OF THE DRAWINGS

FIG. 1 is a schematic view of the electronic advance system for a two-cylinder engine.

FIGS. 2a, 2b and 2c are detailed wiring diagrams for the system and has various components encircled and designated by letters corresponding to those letters appearing in FIG. 1.

FIGS. 3a-3m are a series of pulse or wave shapes depicting those appearing at different points in the system.

DETAILED DESCRIPTION OF THE DRAWINGS

Figure 2A:
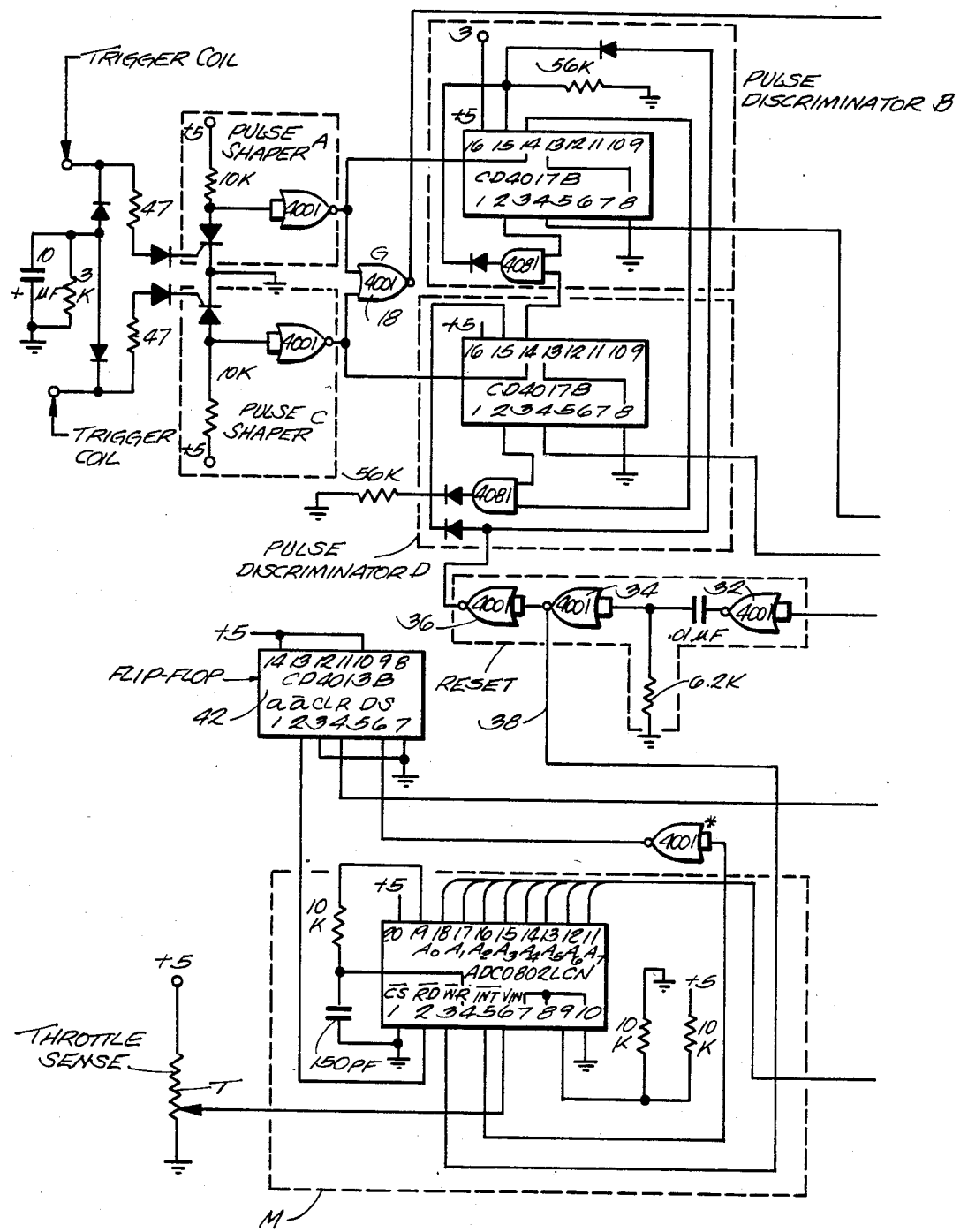

In describing this system, various integrated circuits and other components will be designated by the manufacturer number and the specific performance characteristics of the item will be mentioned only insofar as necessary to understand the present invention. Further details can be found in the relevant component specification sheets but are not necessary to understand this invention.

In the arrangement shown in FIG. 1, a rotating flywheel 10 carried by the crankshaft 11 of a two-cylinder engine is provided with four magnets 12 embedded in the flywheel. The magnetic pick-up 14 located on the stator plate 16 will have pulses induced in its coil as the flywheel rotates. The magnets are arranged so that as the flywheel rotates, the magnetic poles approaching the coil are north-north, south-south. This will induce the trinary waveform shown in FIG. 3a with the middle pulse being smaller in magnitude and of opposite polarity to the principal pulses. The middle pulse is eliminated by a bias circuit (not part of this invention) and the resulting waveform is a succession of two pulses of the same polarity followed by two pulses of opposite polarity.

Each pair of two pulses is applied to a pulse shaper A or C. Each pulse shaper puts out a square wave as depicted in FIGS. 3b and 3c. These square waves are input to an associated pulse discriminator and latch, B or D, and are also input to the OR gate G in FIG. 1 (in FIG. 2 the gate G appears as two NOR gates 18 and 20 which is the equivalent of an OR gate). The gate G passes both square waves so the output of the gate G is a series of square waves as depicted in FIG. 3d. Any change in flywheel speed results in changing the frequency of the pulses coming out of the gate G and applied to the phase lock loop K which, in conjunction with the divide by 90 counter J, constitutes a frequency multiplier. There are four pulses for one revolution of the flywheel and there are four pulses outputed by the gate G per engine revolution. These four pulses are multiplied by 90 in the frequency multiplier resulting in 360 pulses per revolution of the engine. Thus, there is one pulse per degree of rotation of the flywheel. This relationship of one pulse per degree of rotation of the flywheel does not change with speed since the frequency of the phase lock loop K is updated every revolution. Put another way, the time per degree is updated every revolution.

In FIG. 2, the phase lock loop K constitutes an integrated circuit CD4046B which is connected to the input of the integrated circuit CD40103 as well as being connected to the input of a counter L (CD0103B) to input the 360 pulse count frequency.

Each of the pulse discriminators B, D (CD4017B) has twin pulses applied from the appropriate pulse shaper. The pulse discriminators activate latches or gates E and F, that is, each pulse discriminator outputs a square wave pulse, such as depicted in FIGS. 3f and 3g, which results in a positive input to one input of each gate E or F. Thus, pulse discriminator B applies a square wave to one of the inputs of the AND gate E and this is of such duration that a firing pulse applied to the other input will occur during the square wave and permit the gate E to output a positive signal which then is applied to the base of transistor 22 to output a firing pulse to the SCR 24 in series with the primary winding of ignition coil 26, the secondary of which is in series with the spark plug 28 for cylinder 1 of the two-cylinder engine. The magnets embedded in the flywheel are related to the position of the pistons so the pulses applied to the shapers A and C are timed to cause the discriminators B and D to output their pulses in proper timing.

The output from the distribution latches of the discriminators B and D is also applied to the NOR gate H which outputs a negative square wave pulse to counter L to start the count.

The system is provided with a throttle control position sensor T which is a potentiometer which applies a voltage to the analog-to-digital converter M (ADC0802LCN). The output from the A/D converter constitutes an address in the read only memory of the EPROM (NMC27C16) N (hereinafter ROM N) which has been programmed with preset counter information. This enables information contained within the ROM N to be used to preset 8 preset inputs on inputs to the down counter L to, in effect, preset the number of pulses from the frequency multiplier to be counted. The system operates on the basis of the setting of the latch representing the maximum advance obtainable. The actual firing is delayed depending on the information present at the RAM inputs of the preset counter. Thus, each count or pulse counted by the counter is subtracted from the maximum advance.

When the counter has reached the count called for by the throttle sensor and the data stored in the ROM N, the counter L outputs a negative square wave. The negative square wave is depicted in FIG. 3i. The leading edge of this pulse is used to apply a reset signal to (see FIG. 2) the pulse discriminators B and D through the NOR gates 30, 32, 34, 36 arranged in series. The output from gate 34 is also applied to lead 38 to reset the A/D converter M. The output of gate 30, which coincides with the trailing edge of the pulse illustrated in FIG. 3(i) is also applied through the firing circuit 40 which provides a sharp pulse to the input of each of the gates E and F. One of these gates has a pulse on the other of its inputs and that gate will then output a signal to the base of the associated transistor 22 or 46. The firing circuit also applies the same pulse to the reset input of the flip-flop 42 (CD4013B). Reference has been made to firing the spark plug 28 in cylinder No. 1. Spark plug 44 in cylinder No. 2 is fired in a similar way when the distribution gate F passes the signal to the base of the transistor 46 to pass a firing pulse to SCR 48.

This same concept can be used in conjunction with engines having more than two cylinders. The method of generating the pulses may vary and may permit application of the pulse from the gate in the pulse shaper to flip-flop instead of a pulse discriminator. The effect is the same. The need for the pulse discriminators in the form of integrated circuits or for flip-flops is dependent upon the quality of the pulse and discernibility of the pulse coming out of the pulse shaper.

It will be noted that at the upper right of FIG. 2b a five volt power supply is depicted. This utilizes a power supply coil in conjunction with rotating magnetic structure and therefore no external power supply is necessary. The ignition system shown in FIG. 2b incorporates a magneto as is typical of outboard motors and many other small engines.

In summary, the rotating magnets induce pulses in the pick-up coil. These pulses are shaped in the pulse shapers A, C and each shaper outputs pulses to an associated discriminator and latch (B or D) which puts out a pulse to an associated distribution AND gate E or F and also to NOR gate H to start counter L. Both shapers A and C provide signals (two for each shaper for each engine revolution) to the frequency multiplier (90×) made up of phase lock loop K and the divide-by-90 counter J to apply 360 pulses for each engine revolution to the counter L. The throttle sensor T applies a voltage to the A/D converter which outputs an address in the ROM N. The ROM N will provide the number of pulses (degrees) which are counted to be subtracted from the maximum throttle advance before firing the spark plug.

When the desired count is reached, the counter puts out a negative square wave. The leading edge of the wave is applied to reset both discriminators B and D and the A/D converter. The trailing edge of the negative output pulse from the counter L is used to develop the firing pulse which is applied to the distribution gates E and F causing the gate to which the pulse from the discriminator has been applied to pass a pulse to the gate of the transistor (22, 46) which causes a pulse to be applied to the gate of the corresponding SCR in circuit with the primary winding of the ignition coil of one of the engine cylinders. The firing pulse also is applied to reset the flip-flop 42. Since with a two-cylinder engine, one cylinder is fired every 180°, the throttle position is sensed every 180° of engine rotation and the system resets every 180°. Thus, the information is constantly updated and the precise spark advance can be obtained, all in accordance with the preset memory programmed into the ROM N.

This system permits electronic control of the spark advance on small engines which do not generally have a separate power supply. Thus, the magneto supplies enough power to operate the ROM and A/D converter and the associated components to control the spark while reading throttle position only. Good results are obtained particularly with two-cycle engines where spark advance determines engine speed rather than the other way around as in four-cycle engines.

I claim:

1. An ignition advance control for an internal combustion engine including a crankshaft, a throttle control, and at least one cylinder, said ignition advance control comprising
    a spark ignition circuit associated with the cylinder and including trigger means operative to cause an ignition spark,
    means for generating a control pulse associated with the cylinder,
    latch means for enabling said trigger means in response to generation of said control pulse,
    means for generating a constant plurality of sequentially occuring electrical reference pulses during each revolution of the crankshaft,
    means for counting said reference pulses developed during each revolution of the crankshaft,
    means for firing said enabled trigger means in response to said counting means counting a predetermined number of said reference pulses to cause said ignition spark at a predetermined ignition point in each revolution of the crankshaft,
    means for sensing the position of the throttle control, and
    means responsive to said throttle sensing means for varying said predetermined number of reference pulses solely in accordance with the position of the throttle control to vary said predetermined ignition point as appropriate for the position of the throttle control.

2. An ignition advance control for a multiple cylinder internal combustion engine, comprising,
    a spark ignition circuit associated with each cylinder and including trigger means operative to cause the ignition spark,
    means generating a control pulse associated with each cylinder,
    latch means associated with each control pulse generating means and with each ignition circuit and responsive to said control pulse to latch in an enabled state,
    means responsive to said control pulses to provide a predetermined number of reference pulses for each revolution of said engine,
    counting means responsive to said control pulse to count said reference pulses,
    throttle sensing means providing a control voltage,
    a memory storing ignition timing data corresponding to throttle position only,
    converter means responsive to said control voltage to output an address in said memory,
    said memory providing the number of degrees by which the base throttle advance is to be modified and setting said counting means to count said reference pulses to said number,
    said counting means outputing a control signal when said number is reached,
    said control signal being applied to the latch means which has been latched in the enabled state, and
    said latch means being responsive to said control signal and said control pulse to cause said trigger means to operate.

3. An ignition advance control according to claim 2 in which said control signal is applied to said counting means and said control pulse generating means to reset the same.

4. An ignition advance control according to claim 3 in which resetting said pulse generating means is operative to disable the associated latch means.

5. An ignition advance control according to claim 4 in which said control signal is also applied to said memory to reset the same.

6. An ignition advance control according to claim 5 in which the timing of said control pulse indicates said base throttle advance.

7. An ignition advance control according to claim 6 in which said base throttle advance is the maximum advance for the engine and said counting means counts to a number indicative of the number of degrees by which said maximum advance should be reduced.

8. An ignition advance control according to claim 2 in which said pulse generating means includes pulse shaping means having a shaped pulse output,
    the output of all said pulse generating means being applied to said means providing reference pulses which means includes frequency multiplying means.

9. An ignition advance control according to claim 8 including pulse discriminating means between each pulse shaping means and its associated latch means and responsive to said shaped pulse output to provide a latching signal to said latch means, said pulse discriminating means being reset by said control signal and said latching signal terminating when said pulse discriminating means is reset.

10. The combination of the control of claim 2 with a two-cylinder, two-cycle engine having a magneto generating a low voltage power supply which is the only power supply for said engine, said ignition control being powered by said low voltage power supply.

11. An ignition advance system having a two-cylinder, two-cycle engine, comprising,
    a spark plug and ignition circuit associated with each cylinder and having a trigger operative to cause the spark plug to spark,
    said engine having a magneto generating a low voltage power supply, an electronic control for the spark advance, said control being powered by said low voltage power supply, pulse generating means associated with each cylinder and operative to put out a control pulse, an AND gate for each cylinder and having one input receiving the control pulse from one of the two pulse generating means and having its output connected to operate said trigger, the control pulse functioning to latch said gate in an enabled state, frequency multiplying means receiving control pulses from both of said pulses generating means and outputting reference pulses having a frequency related to engine speed, counting means responsive to said control pulse to count said reference pulses, a read only memory storing ignition timing data corresponding to throttle position only, throttle sensing means providing a control voltage, an A/D converter responsive to said control voltage to output an address in said memory, said memory providing the number of degrees by which the base throttle advance is to be modified and setting said counting means to count said reference pulses to said number, said counting means outputting a control signal when said number is reached, said control signal being applied to said other input of said gates so the gate which has a control pulse on said one input will output a signal to said trigger, and means responsive to said control signal to reset both said pulse generating means whereby the control pulse which latched the gate in the enabled state is removed and the gate is disabled.

12. An ignition advance control for an internal combustion engine including a cylinder, a crank shaft and a throttle control, said ignition advance control comprising:

a spark ignition circuit having a trigger for developing an ignition spark in the cylinder in response to application of a control signal to said trigger, means for generating a control pulse associated with the cylinder, latch means for enabling said trigger in response to generation of said control pulse, means for generating a fixed plurality of sequentially occurring electrical reference pulses during each revolution of the crank shaft, a counter coupled to said trigger and to said pulse generating means for counting the total number of said reference pulses generated during each individual rotation of the crank shaft and for applying said control signal to said trigger in response to said total reaching a predetermined number, throttle sensing means responsive to the position of the throttle control for providing a control voltage indicative of the position of the throttle control, converter means coupled to said throttle sensing means for providing a plurality of logic memory addresses in accordance with the level of said control voltage, said logic memory addresses corresponding to particular positions of the throttle control, and memory means coupled to said converter means and responsive to said logic memory addressed for storing a plurality of ignition timing data corresponding to particular positions of the throttle control and for varying said predetermined number by said ignition timing data in accordance solely with the position of the throttle control.

13. An ignition advance control according to claim 12 wherein said ignition timing data comprise individual number values and said memory means decreases said predetermined number by individual ones of said individual number values.

14. An ignition advance control according to claim 13 wherein said individual number values decrease as the throttle control is opened such that ignition timing advances as the throttle opens.

15. An ignition advance control according to claim 14 wherein said individual number values decrease to zero when the throttle control is fully open such that a maximum ignition advance corresponding to said unvaried predetermined number is obtained when the throttle control is fully opened.

* * * * *